Sept. 30, 1941.   J. L. HECHT   2,257,684
WHEEL STRUCTURE
Filed Aug. 24, 1939   2 Sheets-Sheet 1
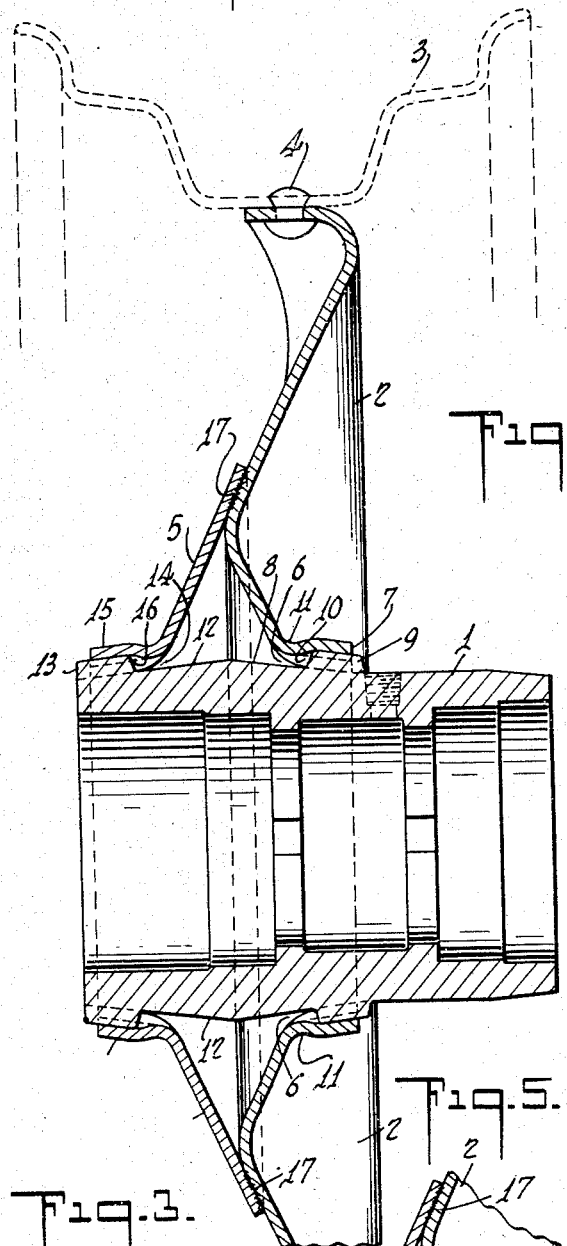
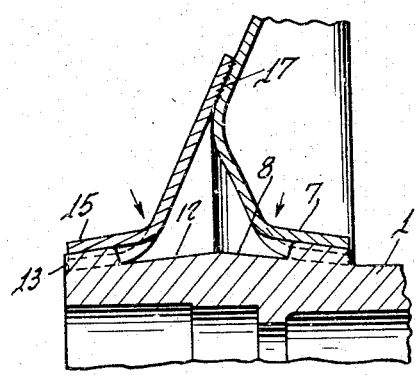
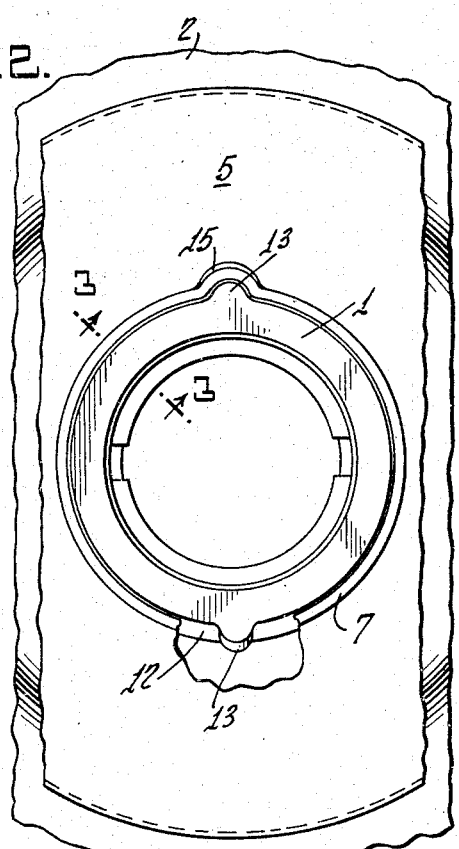
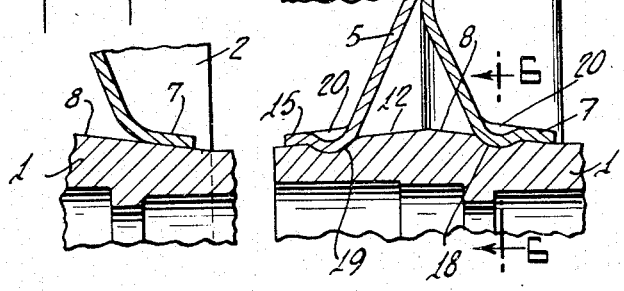
INVENTOR
Joseph L. Hecht
BY
Morrison, Kennedy & Campbell
ATTORNEYS.

Sept. 30, 1941.    J. L. HECHT    2,257,684
WHEEL STRUCTURE
Filed Aug. 24, 1939    2 Sheets-Sheet 2
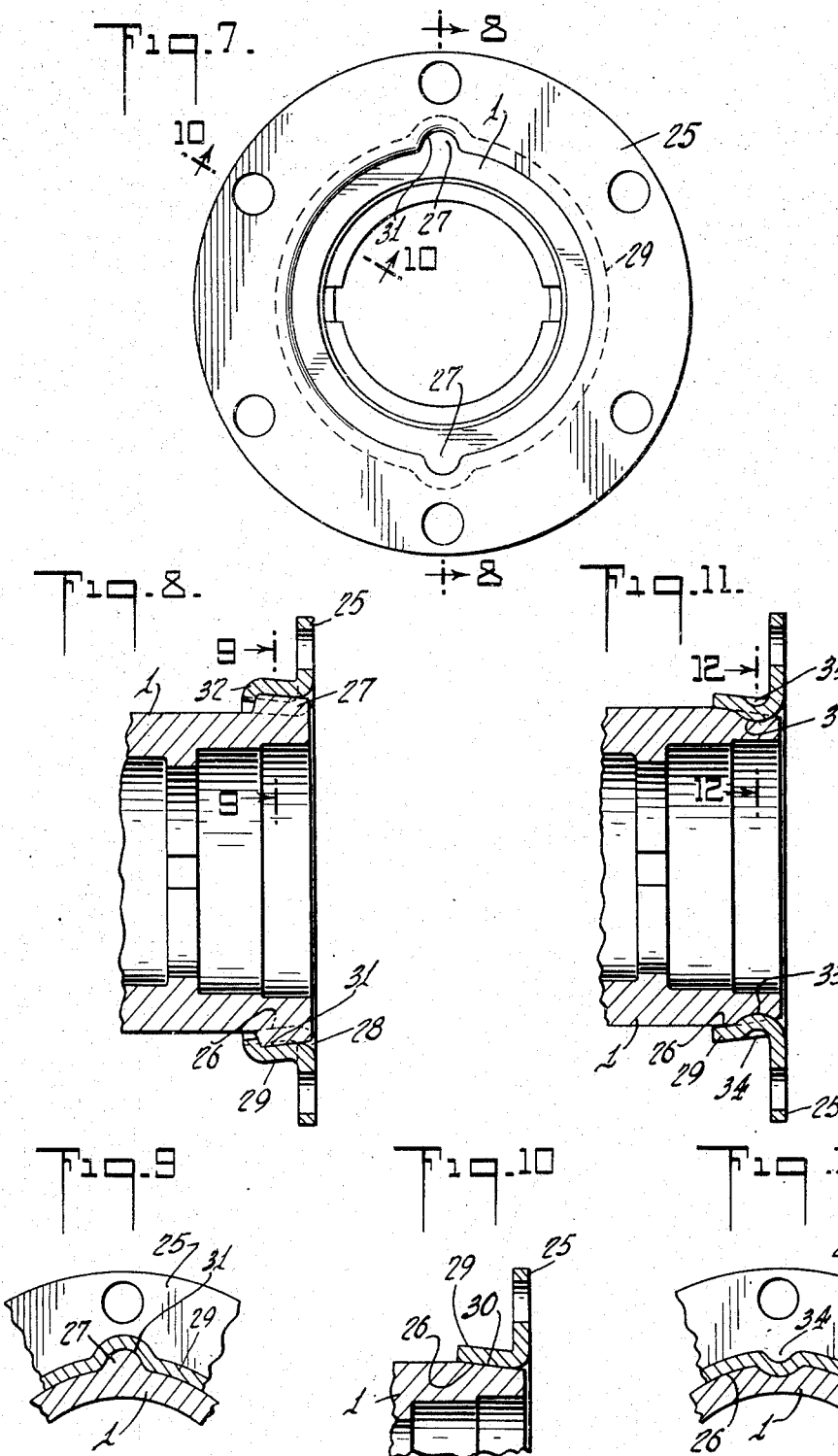
INVENTOR
Joseph L. Hecht
BY
Morrison, Kennedy & Campbell
ATTORNEYS.

Patented Sept. 30, 1941

2,257,684

UNITED STATES PATENT OFFICE 2,257,684

WHEEL STRUCTURE

Joseph L. Hecht, Davenport, Iowa, assignor to French & Hecht, Incorporated, a corporation of Iowa Application August 24, 1939, Serial No. 291,629

11 Claims. (Cl. 301—63)

This invention relates to wheel structures, and more particularly to disc wheels and the method of manufacture thereof.

Disc wheels of the character referred to usually comprise a hub on which there is mounted a disc wheel-center adapted to carry a tire rim. The hub is formed ordinarily with a flange to which the disc is secured by bolts, rivets or by welding, so that the parts are held together rigidly. Lightweight disc wheels frequently are strengthened by providing a small disc which is mounted on the hub and arranged relatively to the main disc to reinforce it at the point where the greatest stresses occur.

It is the object of the present invention to provide a disc wheel wherein the disc wheel-center and other parts carried by the hub are mounted on a flangeless hub and rigidly secured thereto without the use of bolts or rivets.

A feature of the invention is that the weight of the wheel is reduced by the absence of the hub flange and attaching means without decreasing the strength of the wheel, and a considerable saving in the cost of manufacture of the wheel is realized by the elimination of these parts and the manufacturing operations involved by their use.

In its broader aspects, the present invention contemplates the provision of a flangeless wheel hub on which a member carried thereby is mounted and secured in wedging engagement therewith. More specifically, and in accordance with a preferred embodiment of the invention, a portion of the peripheral surface of the hub is formed to provide an inclined annular seat. The disc is formed with a flanged opening into which the hub fits and the hub contacting surface of the flange is correspondingly inclined for wedging engagement with the inclined seat on the hub. In the region of the inclined seat, the hub is formed with a pair of diametrically opposite lugs, and the flange of the disc is formed with a corresponding number of grooves which fit over the lugs in the assembly of the hub and disc. When the disc has been forced into wedging engagement with the inclined seat on the hub, the grooved flange portion of the disc is depressed in back of the lugs, thereby forming an interlocking engagement of portions of the hub and disc which hold the latter firmly wedged on the inclined hub seat. The interfitting of the lugs and grooves prevents relative rotational movement of the hub and disc, as well as relative axial displacement, and serves as a driving connection when the wheel is used as a driver.

When the disc wheel-center is to be reinforced, the hub is formed with a second annular seat, inclined oppositely to the first seat, onto which a small reinforcing disc is wedged. The two discs are spot-welded or otherwise secured together near the periphery of the reinforcing disc and, as in the case of the disc wheel-center, grooved portions of the reinforcing disc are depressed in back of a second pair of diametrically opposite lugs formed on the hub and fitting in the grooves.

In the event that a supporting plate is required for carrying a brake drum or some other part, the plate is secured to the hub in like manner. Thus, at its axially inner end the hub is formed with an inclined annular seat and a pair of diametrically opposite lugs. The plate is formed with a flanged opening to fit over the hub, the flange having a correspondingly inclined surface to adapt it for a wedging engagement with the inclined seat on the hub. The flange of the plate is formed with grooves into which the lugs fit, and after the plate is wedged onto the hub seat the ends of the grooved portions of the flange are depressed in back of the lugs and thus interlocked therewith to hold the plate in wedging engagement with the hub seat. As in the case of the disc, the lugs prevent relative rotational movement of the hub and plate.

In the accompanying drawings, the invention has been shown merely by way of example and in preferred form, but obviously many variations and modifications may be made therein which will still be comprised within its spirit. It is to be understood, therefore, that the invention is not limited to any specific form or embodiment, except insofar as such limitations are specified in the appended claims.

Referring to the drawings:

Fig. 1 is a vertical section through the hub, wheel-center and tire rim, the parts being partly broken away and partly in phantom;

Fig. 2 is a side elevation of a portion of the structure shown in Fig. 1, some of the parts being broken away;

Fig. 3 is a fragmentary sectional view taken on the line 3—3 of Fig. 2, looking in the direction of the arrows;

Fig. 4 is a fragmentary vertical section, showing portions of the hub and wheel-center before they are secured together;

Fig. 5 is a fragmentary vertical section through the hub and wheel-center, showing a modification of the invention;

Fig. 6 is a fragmentary sectional view taken on the line 6—6 of Fig. 5, looking in the direction of the arrows;

Fig. 7 is a side elevation of a wheel hub with a supporting plate secured thereto;

Fig. 8 is a sectional view taken on the line 8—8 of Fig. 7, looking in the direction of the arrows;

Fig. 9 is a fragmentary section taken on the line 9—9 of Fig. 8, looking in the direction of the arrows;

Fig. 10 is a fragmentary section taken on the line 10—10 of Fig. 7, looking in the direction of the arrows;

Fig. 11 is a vertical section similar to that shown in Fig. 8, showing a modification of the invention; and Fig. 12 is a fragmentary section taken on the line 12—12 of Fig. 11, looking in the direction of the arrows.

Referring particularly to Figs. 1 to 4, the wheel structure comprises a hub 1 on which there is mounted a disc wheel-center 2 carrying a tire rim 3 secured thereto as by rivets 4. In the embodiment shown, the disc 2 is reinforced by a smaller disc 5 mounted on the hub 1 in supporting relation to the disc 2.

According to the present invention, the disc wheel-center 2 is formed with a central opening 6 to accommodate the hub 1, the disc being formed with a flange 7 which provides a substantial bearing surface for engagement with the hub. The hub 1 is formed with an annular inclined seat 8, and the hub engaging surface of the flange 7 of the disc 2 is correspondingly inclined to provide for a wedging engagement thereof with the seat 8 when the parts are assembled. In the region of the seat 8, the hub 1 is formed with diametrically opposite upstanding lugs 9, and the flange 7 of the disc is stamped or otherwise formed to provide grooves 10 which fit over the lugs 9 when the disc 2 is being mounted on the hub 1 and forced into wedging engagement with the seat 8 on the hub. When the parts are thus arranged, as shown in Fig. 4, the flange 7 is then acted upon at the point indicated by the arrow to upset or depress the grooved portions of the flange, as at 11, in back of the lugs 9. This upsetting of the flange 7 forms an interlocking connection between the disc 2 and the lugs 9, which tends to force the disc into tighter wedging engagement with the seat 8 on the hub and thereafter serves to hold the parts in their wedged relationship and prevent relative axial movement. The engagement of the lugs 9 on the hub 1 in the grooves 10 of the flange 7 prevents relative rotational movement between the hub and the disc 2, which is especially advantageous when the wheel is to be used as a driver.

Although a reinforced type of disc wheel has been shown in the drawings, an unreinforced disc wheel such as just described can be provided with the disc 2 firmly secured to the hub 1 in the manner set forth. In the reinforced disc wheel, a second annular seat 12 is formed on the hub 1, being inclined axially opposite to the seat 8; and a second pair of diametrically opposite upstanding lugs 13 are formed on the hub. Like the disc 2, the reinforcing disc 5 is formed with a flanged central opening 14 to accommodate the hub 1, the flange 15 being correspondingly inclined for wedging engagement with the seat 12 on the hub and being formed with grooves 16 to fit over the lugs 13. In the assembly of the parts, the disc wheel-center 2 and the reinforcing disc 5 are mounted on the hub 1 with the inclined hub engaging surfaces of the flanges 7 and 15 forced into wedging engagement with the hub seats 8 and 12, respectively, and the discs are then secured together by spot-welding (or other suitable means) as at 17. The parts then occupy the position shown in Fig. 4 with the discs 2 and 5 in firm wedging engagement with the oppositely inclined hub seats 8 and 12, respectively. For a light duty wheel, such arrangement might be sufficient to secure the wheel-center and hub together. However, to lock the parts securely together, the flange 7 of the disc 2 is upset and depressed in back of the lugs 9 and the flange 15 on the disc 5 is likewise upset at the point indicated by the arrow in Fig. 4 and depressed behind the lugs 13 on the hub 1.

In the modification shown in Figs. 5 and 6, the structure is the same with the exception that, instead of the lugs 9 and 13, recesses 18 and 19 are formed in the hub 1 in the regions of the hub seats 8 and 12, respectively. After the discs 2 and 5 have been mounted on the hub 1 in wedging engagement with their respective hub seats 8 and 12 and secured together as at 17, the flanges 7 and 15 are depressed as at 20 into the recesses 18 and 19, respectively, and thus form interlocking connections between the discs 2 and 5 and the hub 1.

It is necessary to provide a flange or supporting plate on the hub in the event that a brake drum or some other part is to be carried thereby. In Figs. 7 to 10, an arrangement has been shown for mounting a supporting plate 25 on the hub 1. According to a preferred embodiment, the end of the hub 1 is formed with an annular inclined seat 26. A pair of diametrically opposite lugs 27 are formed on the seat 26 to extend axially of the hub. The supporting plate 25 is formed with a central opening 28 having a flange 29 formed with a hub engaging surface 30 correspondingly inclined for wedging engagement with the hub seat 26, the flange 29 being formed with grooves 31 which fit over the lugs 27 on the hub 1.

In the assembly of the parts, the supporting plate 25 is fitted over the end of the hub 1, and the hub engaging surface 30 of the flange 29 is forced into wedging engagement with the inclined hub seat 26. The free edges of the grooved portions of the flange 29 are then upset or depressed as at 32 into interlocking engagement with the axially inner ends of the lugs 27. Thus, the supporting plate 25 is rigidly secured in wedging engagement with the hub seat 26 and held thereon by the interlocking connection provided by the bent over edges 32 of the flange 29 and the lugs 27 formed on the hub. The engagement of the lugs 27 in the grooves 31 of the flange 29 prevents relative rotational movement between the supporting plate 25 and the hub 1.

In Figs. 11 and 12, the interlocking connection between the hub 1 and the plate flange 29 is provided by the formation of recesses 33 in the hub in the region of the seat 26, into which recesses portions of the flange 29 are depressed, as at 34. The recesses 33 take the place of the lugs 27 of the embodiment shown in Figs. 7 to 10, but otherwise the parts are the same.

As already stated, a preferred embodiment of the invention has been shown merely by way of example, and variations and modifications thereof will occur to those skilled in the art which will still be comprised within its scope. Instead of a pair of lugs or a pair of recesses with which the locking connection is made by upsetting the parts, a circumferential series of lugs or recesses could be employed. On the other hand, a continuous circumferential rib or groove could be formed in the hub and adapted for interlocking connection with the disc or plate flange, the relative positions of the inclined hub seats and the rib or groove being such as to permit assembly of the parts. Moreover, after the disc or plate is forced into wedging engagement with its respective hub seat, it could be secured in position by welding. Other modifications may suggest themselves which will still be within the spirit of the invention, and it is to be understood that the invention is not limited to any specific form or embodiment except as such limitations are set forth in the appended claims.

Having thus described my invention, what I claim is:

1. In a wheel structure, the combination of a hub formed on its peripheral surface with a seat and a plurality of circumferentially spaced apart upstanding lugs located in the vicinity of the seat, a member formed with a flanged hub receiving opening, the flanged portion of the member engaging said seat and portions thereof being formed to overlie the lugs on the hub, and means for securing the member to the hub comprising portions of the flange of said member interlocked with the lugs on the hub.

2. In a wheel structure, the combination of a hub formed on its periphery with an inclined seat, a disc wheel-center formed with an opening to accommodate the hub and presenting a correspondingly inclined surface in wedging engagement with the inclined hub seat, a lug formed on the hub in the region of the inclined seat, a groove formed in the disc to fit over the lug on the hub, and means for securing the disc to the hub comprising portions of the disc interlocked with the lug on the hub.

3. In a wheel structure, the combination of a hub formed on its periphery with an inclined seat, a disc wheel-center formed with an opening to accommodate the hub and presenting a correspondingly inclined surface in wedging engagement with the inclined hub seat, said hub being free of disc engaging projecting surfaces at the inclined disc seat end of larger diameter so as to receive the disc on said seat in an axial position determined only by the diameter of the seat-engaging portion of the disc, a recess formed in the hub in the region of the inclined seat, and means for securing the disc to the hub comprising a portion of the disc depressed into the recess formed in the hub.

4. In a wheel structure, the combination of a hub formed on its periphery with an inclined seat, a disc wheel-center formed with an opening to accommodate the hub and presenting a correspondingly inclined surface in wedging engagement with the inclined hub seat, a plurality of circumferentially spaced apart upstanding lugs formed on the hub in the region of the inclined seat, a plurality of grooves formed in the disc to fit over the lugs on the hub, and means for securing the disc to the hub comprising depressed areas of the grooved portions of the disc interlocked with the lugs.

5. In a wheel structure, the combination of a hub formed on its periphery with an inclined seat, a disc wheel-center formed with an opening to accommodate the hub and presenting a correspondingly inclined surface in wedging engagement with the inclined hub seat, said hub being free of disc engaging projecting surfaces at the inclined disc seat end of larger diameter so as to receive the disc on said seat in an axial position determined only by the diameter of the seat-engaging portion of the disc, a plurality of circumferentially spaced apart recesses formed in the hub in the region of the inclined seat, and means for securing the disc to the hub comprising portions of the disc depressed into the recesses in the hub.

6. In a wheel structure, the combination of a hub formed on its periphery with axially oppositely inclined seats, a disc wheel-center formed with an opening to accommodate the hub and presenting an inclined surface in wedging engagement with one of the inclined hub seats, a reinforcing disc formed with an opening to accommodate the hub and presenting an inclined surface in wedging engagement with the other inclined hub seat, means for securing the disc body and reinforcing disc together, a plurality of circumferentially spaced apart lugs formed on the hub in the region of each of the oppositely inclined seats, and means for securing the disc body and reinforcing disc to the hub comprising depressed portions of the disc body and reinforcing disc interlocked with their respective set of lugs.

7. In a wheel structure, the combination of a flangeless hub formed on its periphery with an annular inclined seat, a disc wheel-center formed with a flanged central opening to fit over the hub, the hub engaging surface of the flange being correspondingly inclined for wedging engagement with the annular seat on the hub, a plurality of circumferentially spaced apart upstanding lugs formed on the hub in the region of the annular seat, grooves formed in the flange of the disc to fit over the lugs on the hub, and means for locking the disc in wedging engagement with the annular seat comprising an interlocking engagement of the grooved portions of the disc flange in back of the lugs on the hub, whereby the disc is held against axial and rotational movement relatively to the hub.

8. In a wheel structure, the combination of a hub formed on its periphery with an inclined seat, a plurality of circumferentially spaced apart upstanding lugs formed on the hub in the region of the inclined seat, a supporting plate formed with an opening to accommodate the hub and presenting a correspondingly inclined surface in wedging engagement with the hub seat, grooves formed in the plate to fit over the lugs on the hub, and means for securing the plate to the hub comprising portions of the plate depressed into interlocking engagement with the lugs.

9. In a wheel structure, the combination of a hub formed on its peripheral surface with a seat, a member formed with a flanged hub receiving opening mounted on the hub, the flanged portion of the member engaging said seat, and means for securing the member on the hub comprising a plurality of circumferentially spaced apart radially projecting elements on the hub engaged with the flanged portion of said member.

10. In a wheel structure, the combination of a hub formed on its peripheral surface with an inclined seat, a member formed with a flanged hub receiving opening mounted on the hub, the flanged portion of the member being formed with a correspondingly inclined surface in wedging engagement with said seat, and means for securing the member on the hub with said seat and surface in wedging engagement comprising a plurality of circumferentially spaced apart radially projecting elements on the hub engaged with the flanged portion of said member.

11. In a wheel structure, in combination, a hub member formed with a tapered outer bearing surface defining a wheel supporting seat, and a wheel member formed with a hub receiving opening defined by a correspondingly tapered inner bearing surface engageable with the tapered outer seat of the hub member, said hub being free of wheel member engaging projecting surfaces at the tapered wheel seat end of larger diameter so as to receive the wheel on said tapered seat in an axial position determined only by the diameter of the seat-engaging portion of the wheel member, the tapered outer bearing surface of the hub member being wedged axially into the tapered inner bearing surface of the wheel member to tension the wheel member on the hub member, and interfitting locking portions integral with said hub and wheel members offset from the bearing surfaces thereof constituting the sole securing means for said members and maintaining said parts in their wedging engagement.

JOSEPH L. HECHT.